US006665837B1

(12) United States Patent
Dean et al.

(10) Patent No.: US 6,665,837 B1
(45) Date of Patent: Dec. 16, 2003

(54) METHOD FOR IDENTIFYING RELATED PAGES IN A HYPERLINKED DATABASE

(75) Inventors: Jeffrey Dean, Menlo Park, CA (US); Monika R. Henzinger, Menlo Park, CA (US); Andrei Z. Broder, Menlo Park, CA (US)

(73) Assignee: Overture Services, Inc., Pasadena, CA (US)

( * ) Notice: Subject to any disclaimer, the term of this patent is extended or adjusted under 35 U.S.C. 154(b) by 0 days.

(21) Appl. No.: 09/131,473

(22) Filed: Aug. 10, 1998

(51) Int. Cl.[7] .............................................. G06F 15/00
(52) U.S. Cl. ..................... 715/501.1; 715/513; 707/2
(58) Field of Search ............. 707/2, 4, 5, 102, 707/513, 501; 715/501.1, 513

(56) References Cited

U.S. PATENT DOCUMENTS

| | | | | |
|---|---|---|---|---|
| 5,418,948 A | * | 5/1995 | Turle .............................. | 707/4 |
| 5,594,897 A | * | 1/1997 | Goffman ..................... | 707/102 |
| 5,724,567 A | * | 3/1998 | Rose et al. .................... | 707/2 |
| 5,855,015 A | * | 12/1998 | Shoham ........................ | 707/5 |
| 5,895,470 A | * | 4/1999 | Pirolli et al. ................ | 707/102 |
| 5,905,863 A | * | 5/1999 | Knowles et al. ............. | 707/501 |
| 5,933,823 A | * | 8/1999 | Cullen et al. ................... | 707/6 |
| 5,991,713 A | * | 11/1999 | Unger et al. ................ | 707/513 |
| 6,073,135 A | * | 6/2000 | Broder et al. ............... | 707/100 |
| 6,112,202 A | * | 8/2000 | Kleinberg ...................... | 707/5 |
| 6,112,203 A | * | 8/2000 | Bharat et al. ................... | 707/5 |
| 6,115,718 A | * | 9/2000 | Huberman et al. ......... | 707/102 |
| 6,138,113 A | * | 10/2000 | Dean et al. ..................... | 707/2 |
| 6,334,145 B1 | * | 12/2001 | Adams et al. .............. | 709/217 |

OTHER PUBLICATIONS

Guinan et al., Infromation Retrieval from Hypertext Using Dynamically Planned Guided Tours, ACM 1992, pp. 122–130.*
Salton et al., Selective Text Utilization and Text Traversal, ACM 1993, pp. 131–144.*
Chekuri et al, Web Search Using Automatic Classification, Google, Dec. 1996, pp. 1–11.*
Kleinberg, Authoritative Sources in a Hyperlinked Environment, Google, May 1997, pp. 668–677.*

* cited by examiner

Primary Examiner—Stephen S. Hong
Assistant Examiner—Cong-Lac Huynh
(74) Attorney, Agent, or Firm—Brown Raysman Millstein Felder & Steiner LLP

(57) ABSTRACT

A method is described for identifying related pages among a plurality of pages in a linked database such as the World Wide Web. An initial page is selected from the plurality of pages. Pages linked to the initial page are represented as a graph in a memory. The pages represented in the graph are scored on content, and a set of pages is selected, the selected set of pages having scores greater than a first predetermined threshold. The selected set of pages is scored on connectivity, and a subset of the set of pages that have scores greater than a second predetermined threshold are selected as related pages.

54 Claims, 2 Drawing Sheets

METHOD FOR IDENTIFYING RELATED PAGES IN A HYPERLINKED DATABASE

FIELD OF THE INVENTION

This invention relates generally to computerized information retrieval, and more particularly to identifying related pages in a hyperlinked database environment such as the World Wide Web.

BACKGROUND OF THE INVENTION

It has become common for users of host computers connected to the World Wide Web (the "Web") to employ Web browsers and search engines to locate Web pages having specific content of interest to users. A search engine, such as Digital Equipment Corporation's AltaVista search engine, indexes hundreds of millions of Web pages maintained by computers all over the world. The users of the hosts compose queries, and the search engine identifies pages that match the queries, e.g., pages that include key words of the queries. These pages are known as a "result set."

In many cases, particularly when a query is short or not well defined, the result set can be quite large, for example, thousands of pages. The pages in the result set may or may not satisfy the user's actual information needs. Therefore, techniques have been developed to identify a smaller set of related pages.

In one prior art technique used by the Excite search engine, please see "http://www.excite.com," users first form an initial query, using the standard query syntax for the Excite search engine that attempts to specify a topic of interest. After the result set has been returned, the user can use a "Find Similar" option to locate related pages. However, there the finding of the related pages is not fully automatic because the user first is required to form a query, before related pages can be identified. In addition, that technique only works on the Excite search engine and for the specific subset of Web pages, it provides related pages that are indexed by the Excite search engine.

In another prior art technique, an algorithm for connectivity analysis of a neighborhood graph (n-graph) is described by Kleinberg in "Authoritative Sources in a Hyperlinked Environment," Proc. 9th ACM-SIAM Symposium on Discrete Algorithms, 1998, and also in IBM Research Report RJ 10076, May 1997, see, "http://www.cs.cornell.edu/Info/People/kleinber/auth.ps". The Kleinberg algorithm analyzes the link structure, or connectivity of Web pages "in the vicinity" of the result set to suggest useful pages in the context of the search that was performed.

The vicinity of a Web page is defined by the hyperlinks that connect the page to others. A Web page can point to other pages, and the page can be pointed to by other pages. Close pages are directly linked, farther pages are indirectly linked via intermediate pages. This connectivity can be expressed as a graph where nodes represent the pages, and the directed edges represent the links. The vicinity of all the pages in the result set, up to a certain distance, is called the neighborhood graph.

Specifically, the Kleinberg algorithm attempts to identify "hub" pages and "authority" pages in the neighborhood graph for a user query. Hubs and authorities exhibit a mutually reinforcing relationship.

The Kleinberg paper cited above also describes an algorithm that can be used to determine related pages by starting with a single page. The algorithm works by first finding a set of pages that point to the page, and then running the base algorithm on the resulting graph. However, this algorithm for finding related pages differs from our invention in that it does not deal with popular URLs, with neighborhood graphs containing duplicate pages, or with cases where the computation is totally dominated by a single "hub" page, nor does the algorithm include an analysis of the contents of pages when it is computing the most related pages.

The CLEVER Algorithm is a set of extensions to Kleinberg's algorithm, see S.Chakrabarti et al, "Experiments in Topic Distillation," ACM SIGIR Workshop on Hypertext Information Retrieval on the Web, Melbourne, Australia, 1998. The goal of the CLEVER algorithm is to distill the most important sources of information from a collection of pages about a topic.

In U.S. patent application Ser. No. 09/007,635 "Method for Ranking Pages Using Connectivity and Content Analysis" filed by Bharat et al. on Jan. 15, 1998, a method is described that examines both the connectivity and the content of pages to identify useful pages. However, the method is relatively slow because all pages in the neighborhood graph are fetched in order to determine their relevance to the query topic. This is necessary to reduce the effect of non-relevant pages in the subsequent connectivity analysis phase.

In U.S. patent application Ser. No. 09/058,577 "Method for Ranking Documents in a Hyperlinked Environment using Connectivity and Selective Content Analysis" filed by Bharat et al. on Apr. 9, 1998, now U.S. Pat. No. 6,112,203, a method is described which performs content analysis on only a small subset of the pages in the neighborhood graph to determine relevance weights, and pages with low relevance weights are pruned from the graph. Then, the pruned graphed is ranked according to a connectivity analysis. This method still requires the result set of a query to form a query topic.

Therefore, there is a need for a method for identifying related pages in a linked database that does not require a query and the fetching of many unrelated pages.

SUMMARY OF THE INVENTION

Provided is a method for identifying related pages among a plurality of pages in a linked database such as the World Wide Web. An initial page is selected from the plurality of pages by specifying the URL of the page or clicking on the page using a Web browser in a convenient manner.

Pages linked directly or indirectly to the initial page are represented as a neighborhood graph in a memory. The pages represented in the graph are scored on content using a similarity measurement using a topic extracted from a chosen subset of the represented pages.

A set of pages is selected from the pages in the graph, the selected set of pages having scores greater than a first predetermined threshold and do not belong to a predetermined list of "stop URLs." Stop URLs are highly popular, general purpose sites such as search engines. The selected set of pages is then scored on connectivity, and a subset of the set of pages that have scores greater than a second predetermined threshold are selected as related pages. Finally, during an optional pass, content analysis can be done on highly ranked pages to determine which pages have high content scores.

DETAILED DESCRIPTION OF PREFERRED EMBODIMENTS

System Overview

Figure 1:
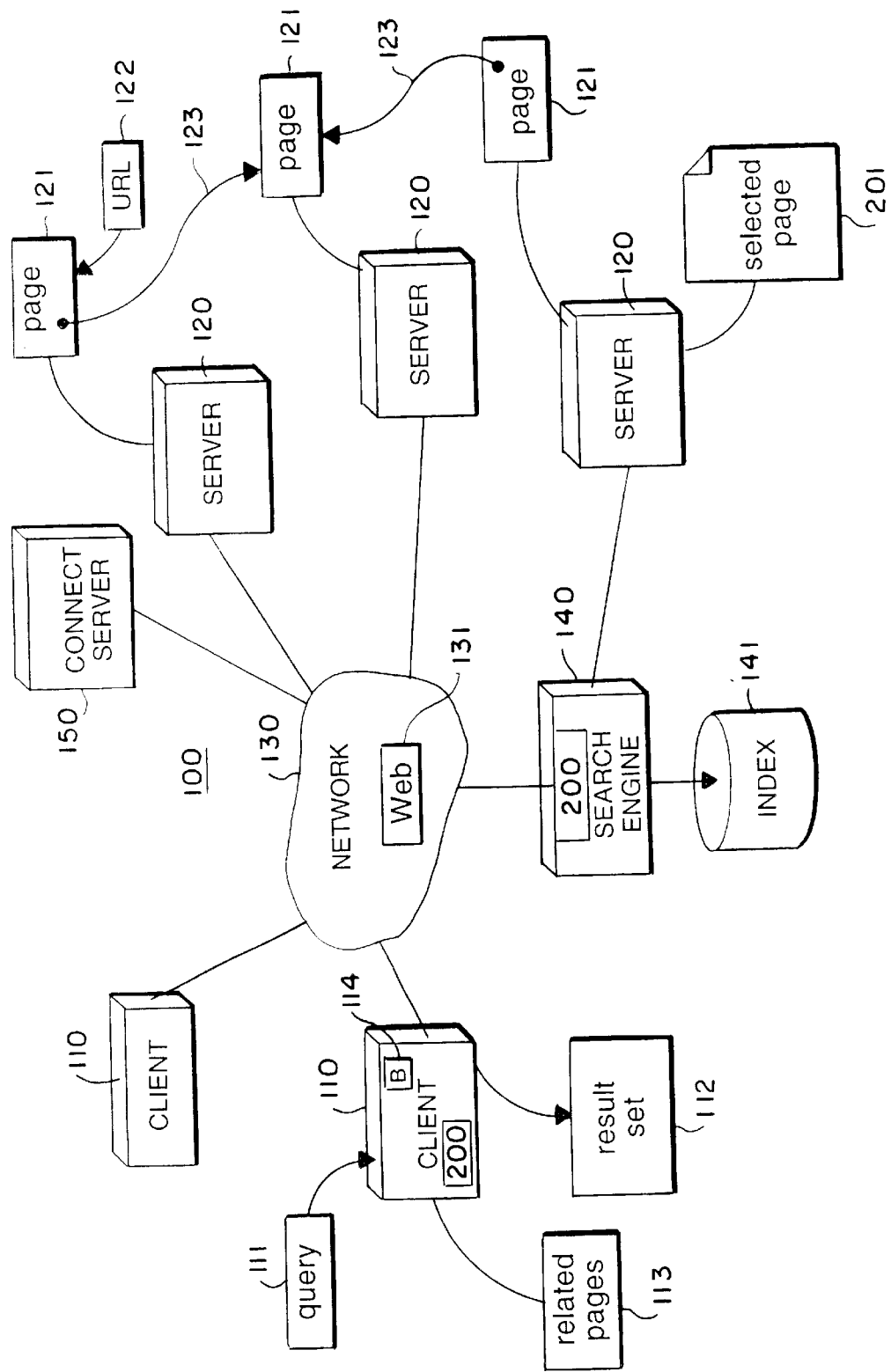
FIG. 1 is a block diagram of a hyperlinked environment that uses the invention.

FIG. 1 shows a database environment 100 where the invention can be used. The database environment is an arrangement of client computers 110 and server computers 120 (generally "hosts") connected to each other by a network 130, for example, the Internet. The network 130 includes an application level interface called the World Wide Web (the "Web") 131.

The Web 131 allows the clients 110 to access documents, for example, multi-media Web pages 121 maintained by the servers 120. Typically, this is done with a Web browser application program (B) 114 executing in the client 110. The location of each page 121 is indicated by an associated Universal Resource Locator (URL) 122. Many of the pages include "hyperlinks" 123 to other pages. The hyperlinks are also in the form of URLs.

Although the invention is described with respect to documents that are Web pages, it should be understood that our invention can also be applied to any linked data objects of a database whose content and connectivity can be characterized.

In order to help users locate Web pages of interest, a search engine 140 can maintain an index 141 of Web pages in a memory, for example, disk storage. In response to a query 111 composed by a user using the Web browser (B) 114, the search engine 140 returns a result set 112 which satisfies the terms (key words) of the query 111. Because the search engine 140 stores many millions of pages, the result set 112, particularly when the query 111 is loosely specified, can include a large number of qualifying pages.

These pages may, or may not be related to the user's actual information need. Therefore, the order in which the result 112 set is presented to the client 110 is indicative of the usefulness of the search engine 140. A good ranking process will return only "useful" pages before pages that are less so.

We provide an improved ranking method 200 that can be implemented as part of a search engine 140. Alternatively, our method 200 can be implemented by one of the clients 110 as part of the Web browser 114. Our method uses content analysis, as well as connectivity analysis, to improve the ranking of pages in the result set 112 so that just pages related to a particular topic are identified.

Introduction

Our invention is a method that takes an initial single selected Web page 201 as input, and produces a subset of related Web pages 113 as output. Our method works by examining the "neighborhood" surrounding the initial selected page 201 in a Web neighborhood graph and examining the content of the initial selected page and other pages in the neighborhood graph.

Our method relies on the assumption that related pages will tend to be "near" the selected page in the Web neighborhood graph, or that the same keywords will appear as part of the content of related pages. The nearness of a page can be expressed as the number of links (K) that need to be traversed to reach a related page.

Figure 2:
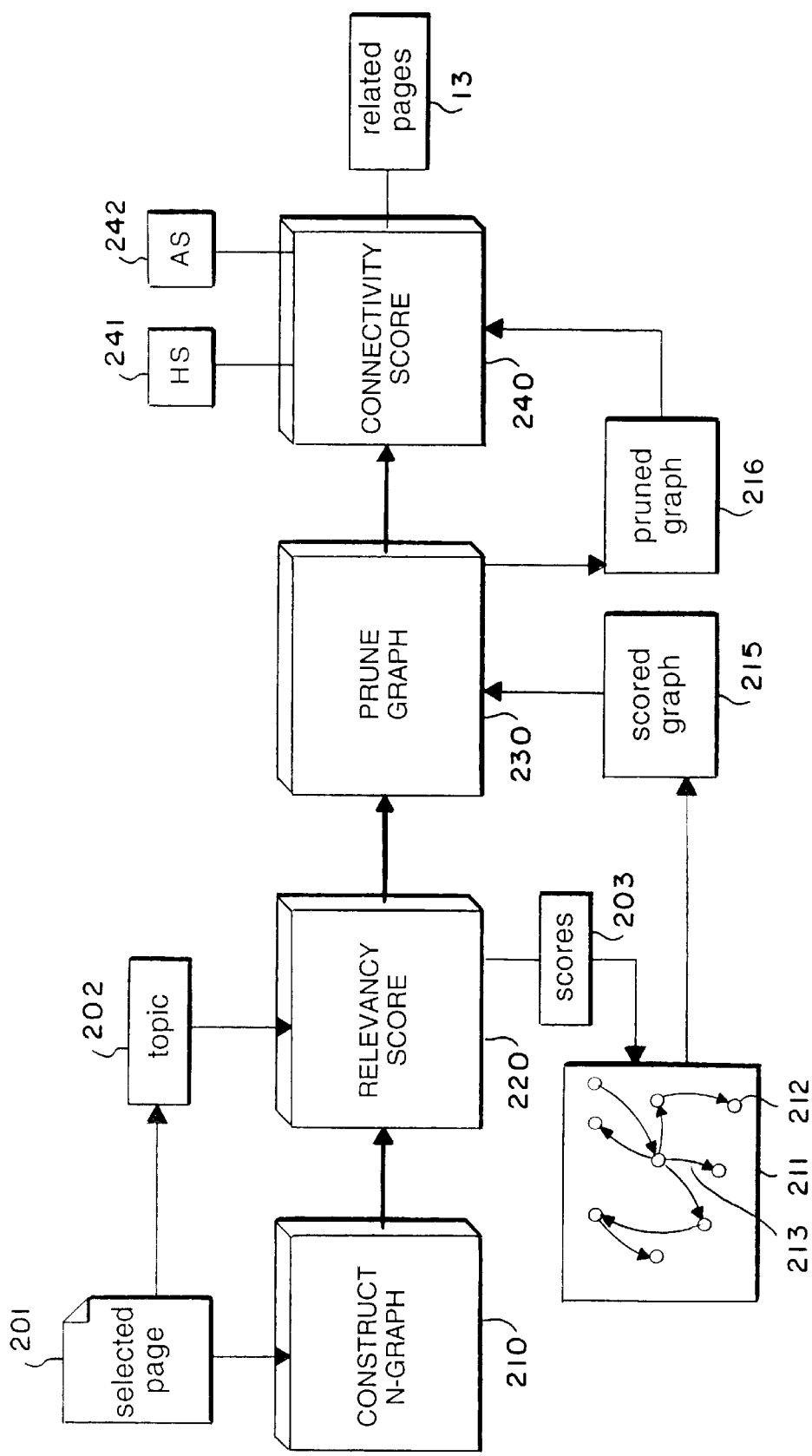
FIG. 2 is a flow diagram of a method according to the invention.

FIG. 2 shows the steps of a method according to our invention. As stated above, the method can be implemented as a software program in either a client or server computer. In either case, the computers 110, 120, and 140 include conventional components such a processor, memory, and I/O devices that can be used to implement our method.

Building the Neighborhood Graph

We start with an initial single selected page 201, i.e., the page 201 includes a topic which is of interest to a user. The user can select the page 201 by, for example, giving the URL or "clicking" on the page. It should be noted that the initial selected page can be any type of linked data object, text, video, audio, or just binary data as stated above.

We use the initial page 201 to construct 210 a neighborhood graph (n-graph) 211 in a memory. Nodes 212 in the graph represent the initial selected page 201 as well as other closely linked pages, as described below. The edges 213 denote the hyperlinks between pages. The "size" of the graph is determined by K which can be preset or adjusted dynamically as the graph is constructed. The idea being that the graph needs to represent a meaningful number of pages.

During the construction of the neighborhood graph 211, the direction of links is considered as a way of pruning the graph. In the preferred implementation, with K=2, our method only includes nodes at distance 2 that are reachable by going one link backwards ("B"), pages reachable by going one link forwards ("F"), pages reachable by going one link backwards followed by one link forward ("BF") and those reachable by going one link forwards and one link backwards ("FB"). This eliminates nodes that are reachable only by going forward two links ("FF") or backwards two links ("BB").

To eliminate some unrelated nodes from the neighborhood graph 211, our method relies on a list of "stop" URLs. Stop URLs are URLs that are so popular that they are frequently referenced from many, many pages, such as, for instance URLs that refer to popular search engines. An example is "www.altavista.com." These "stop" nodes are very general purpose and so are generally not related to the specific topic of the selected page 201, and consequently serve no purpose in the neighborhood graph. Our method checks each URL against the stop list during the neighborhood graph construction, and eliminates the node and all incoming and outgoing edges if a URL is found on the stop list.

In some cases, the neighborhood graph becomes too large. For example, highly popular pages are often pointed to by many thousands of pages and including all such pages in the neighborhood graph is impractical. Similarly, some pages contain thousands of outgoing links, which also causes the graph to become too large. Our method filters the incoming or outgoing edges by choosing only a fixed number M of them. In our preferred implementation, M is 50. In the case that the page was reached by a backwards link L, and the page has more than M outgoing links, our method chooses the M links that surround the link L on the page.

In the case of a page P that has N pages pointing to page P, our method will choose only a subset of M of the pages for inclusion in the neighborhood graph. Our method chooses the subset of M pages from the as larger set of N pages pointing to page P by selecting the subset of M pages with the highest in-degree in the graph. The idea being that pages with high in-degree are likely to be of higher quality than those with low in-degree.

In some cases, pages will have identical content, or nearly identical content. This can happen when pages were copied, for example. In such cases, we want to include only one such page in our neighborhood graph, since the presence of multiple copies of a page will tend to artificially increase the importance of any pages that the copies point to. We collapse duplicate pages to a single node in the neighborhood graph. There are several ways that one could identify duplicate pages.

One way examines the textual content of the pages to see if they are duplicates or near-duplicates, as described by Broder et al. in U.S. patent application Ser. No. 09/048,653, "Method for clustering closely resembling data objects," filed Mar. 26, 1998, now U.S. Pat. No. 6,119,124. Another way that is less computationally expensive and which does not require the content of the page, is to examine the outgoing links of two pages. If there are a significant number of outgoing links and they are mostly identical, these pages are likely to be duplicates. We identify this case by choosing a threshold number of links Q. Pages P1 and P2 are considered near duplicates if both P1 and P2 have more than Q links, and a large fraction of their links are present in both P1 and P2.

Relevancy Scoring of Nodes in the Neighborhood Graph

We next score 220 the content of the pages represented by the graph 211 with respect to a topic 202. We extract the topic 202 from the initial page 201.

Scoring can be done using well known retrieval techniques. For example, in the Salton & Buckley model, the content of the represented pages 211 and the topic 202 can be regarded as vectors in an n-dimensional vector space, where n corresponds to the number of unique terms in the data set.

A vector matching operation based on the cosine of the angle between vectors is used to produce scores 203 that measure similarity. Please see, Salton et al., "Term-Weighting Approaches in Automatic Text Retrieval," Information Processing and Management, 24(5), 513–23, 1988. A probabilistic model is described by Croft et al. in "Using Probabilistic Models of Document Retrieval without Relevance Feedback," Documentation, 35(4), 285–94, 1979. For a survey of ranking techniques in Information Retrieval see Frakes et al., "Information Retrieval: Data Structures & Algorithms," Chapter 14—'Ranking Algorithms,' Prentice-Hall, NJ, 1992.

Our topic vector can be determined as the term vector of the initial page 201, or as a vector sum of the term vector of the initial selected page and some function of the term vectors of all the pages presented in the neighborhood graph 211. One such function could simply weight the term vectors of each of the pages equally, while another more complex function would give more weight to the term vectors of pages that are at a smaller distance K from the selected page 201. Scoring 220 results in a scored graph 215.

Pruning Nodes in the Scored Neighborhood Graph

After the graph has been scored, the scored graph 215 is "pruned" 230 to produce a pruned graph 216. Here, pruning means removing those nodes and links from the graph that are not "similar." There are a variety of approaches which can be used as the threshold for pruning, including median score, absolute threshold, or a slope-based approach.

In addition, content analysis can be used to guide the neighborhood graph construction process by extending the search out to larger distances of K for pages whose contents are closely related to the original page, and cutting off the neighborhood graph construction at smaller values of K when pages are reached that have very little content in common with the original page.

Connectivity Scoring the Pruned Graph

In step 240, the pruned graph 216 is scored again, this time based on connectivity. This scoring effectively ranks the pages, and pages above a predetermined rank can be presented to the user as the related pages 113.

One algorithm which performs this scoring is the Kleinberg algorithm mentioned previously. This algorithm works by iteratively computing two scores for each node in the graph: a hub score (HS) 241 and an authority score 242. The hub score 241 estimates good hub pages, for example, a page such as a directory that points to many other relevant pages. The authority score 242 estimates good authority pages, for example, a page that has relevant information.

The intuition behind Kleinberg's algorithm is that a good hub is one that points to many documents and a good authority is one that is pointed to by many documents. Transitively, an even better hub is one that points to many good authorities, and an even better authority is one that is pointed to by many good hubs.

Bharat et al., cited above, have come up with several improved algorithms that provide more accurate results than Kleinberg's algorithm, and any of these could be used as in step 240.

If a single node has dominated the computation as a hub node, that is, exerted "undue influence", then it is sometimes beneficial to remove that node from the neighborhood graph, and repeat the scoring phase 240 on the graph with the node removed. One way of detecting when this undue influence has been exerted is when a single node has a large fraction of the total hub scores of all the nodes (e.g., more than 95% of the total hub scores is attributed to a single node). Another means determines if the node with the highest hub score has more than three times the hub score of the next highest hub score. Other means of determining undue influence are possible.

Differences with the Prior Art

Our method differs from prior art in the graph building and pruning steps. A simple prior art building method treated the n-graph as an undirected graph and used any page within a distance K to construct the graph. Refinements to this method consider the graph as directed and allowed a certain number of backward hyperlink traversals as part of the neighborhood graph construction. Notice, this refinement requires backwards connectivity information that is not directly present in the Web pages themselves.

This information can be provided by a server 150, such as a connectivity server or a search engine database, see U.S. patent application Ser. No. 09/037,350 "Connectivity Server" filed by Broder et al. on Mar. 10, 1998, now U.S. Pat. No. 6,073,135. Typical values of K can be 2 or 3. Alternatively, K can be determined dynamically, depending on the size of the neighborhood graph, for example, first try to build a graph for K=2, and if this graph is not considered large enough, use a larger value for K.

There are two differences in our method. First, we start with a single Web page as input, rather than the result set produced by a search engine query. The second difference deals with how the initial neighborhood graph 211 is constructed. Kleinberg includes all pages that have a directed path of length K from or to the initial set.

In contrast, we look at the Web graph as an undirected graph and include all pages that are K undirected links away from our initial selected page. This has the benefit of including pages that can be reached by an "up-down" path traversals of the graph, such as pages that are both indexed by the same directory page, but which are not reachable from each other using just a directed path. In some cases we choose to specify the type of paths allowed explicitly, e.g., only F, B, FB, BF as described above.

In the presence of useful hub pages, pages that point to many related pages, our approach will include all of the related pages referenced by the hub which might be similar to the selected page 201 in our neighborhood graph.

Pruning

Our method differs from the Kleinberg method because there no pruning of the neighborhood graph is performed. Bharat et al. improves the Kleinberg method by pruning the graph to leave a subset of pages that are fed to the ranking step to yield more accurate results.

However, because we start with a single Web page, rather than with results of a query, we do not have an initial query against which to measure the relevance of the related pages. Instead, we use the content of the initial page, and optionally the content of other pages in the neighborhood graph to arrive at a topic vector.

Scoring

Our method differs from Kleinberg's algorithm in the scoring phase in that we detect cases where a node has exerted "undue influence" on the computation of hub scores. In this case, we remove the node from the graph and repeat the scoring computation without this node in the graph. This change tends to produce a more desirable ordering of related pages where highly rated pages are referred to by more than one page. Kleinberg's algorithm does not include any such handling of nodes with undue influence.

Advantages and Applications

Our invention enables automatic identification of Web pages related to a single Web page. Thus, if a user locates just one page including an interesting topic, then other pages related to the topic are easily located. According to the invention, the relationship is established through the use of connectivity and content analysis of the page and nearby pages in the Web neighborhood.

By omitting the content analysis steps of our method, the method is able to identify related URLs for the selected page 201 solely through connectivity information. Since this information can be quickly provided by means of a connectivity server 150, the set of related pages can be identified without fetching any pages or examining the contents of any pages.

One application of this invention allows a Web browser in a client computer to provide a "Related Pages" option, whereby users can quickly access any of the related pages. Another application is in a server computer that implements a Web search engine. There, a similar option allows a user to list just related pages, instead of the entire result set of a search.

It is understood that the above-described embodiments are simply illustrative of the principles of the invention. Various other modifications and changes may be made by those skilled in the art which will embody the principles of the invention and fall within the spirit and scope thereof.

We claim:

1. A method for identifying pages related to an initial page, comprising:

identifying a plurality of pages linked to the initial page;

representing the plurality of pages as a graph of nodes;

scoring the plurality of pages on connectivity of said plurality of pages to the initial page to generate a connectivity score for each of said plurality of pages;

removing from the graph of nodes pages with an undue influence on the scoring of other pages in the plurality of pages, wherein a page has the undue influence on the scoring of other pages in the plurality of pages, when said page has a score greater than a predetermined fraction of a total connectivity score, said total connectivity score computed by summing connectivity scores of the plurality of pages;

re-scoring remaining pages represented in the graph of nodes; and selecting a subset of the remaining pages represented in the graph of nodes that have connectivity scores greater than a first predetermined threshold as the pages related to the initial page.

2. The method of claim 1 wherein the initial page is selected by specifying an address of the page.

3. The method of claim 1 wherein the initial page is selected by a user interface.

4. The method of claim 1 wherein the connectivity of the plurality of pages are scored on content by measuring the similarity of the plurality of pages to a topic.

5. The method of claim 4 wherein the topic is extracted from the initial page.

6. The method of claim 4 wherein the topic is extracted from the plurality of pages represented in the graph.

7. The method of claim 1 wherein any of the plurality of pages that are linked in any direction to the initial page are represented in the graph.

8. The method of claim 7 wherein the plurality of pages represented in the graph are linked to the initial page by a predetermined number of links.

9. The method of claim 7 wherein each page represented in the graph depends on a path from each page to the initial page, the path including the length of the path and the direction of edges on the path.

10. The method of claim 7 wherein the plurality of pages represented in the graph as nodes are linked to the node representing the initial page by a number of edges that is determined dynamically.

11. The method of claim 1 performed in a client computer.

12. The method of claim 1 performed in a server computer.

13. The method of claim 1, wherein the predetermined fraction of the total connectivity score is equal to ninety-five percent of the total connectivity score.

14. The method of claim 1, wherein the step of identifying a plurality of pages linked to the initial page comprises identifying a plurality of pages linked to the initial page by not more than a defined number of links, wherein when said defined number of links is set to two, a page is linked to said initial page only if said page is reachable from said initial page by going one link backwards, said page is reachable from said initial page by going one link forwards, said page is reachable from said initial page by going one link backwards followed by one link forwards, or said page is reachable from said initial page by going one link forward followed by one link backwards.

15. A method for identifying pages related to an initial page, comprising:

identifying a plurality of pages linked to the initial page;

representing the plurality of pages as a graph of nodes;

scoring the plurality of pages on connectivity of said plurality of pages to the initial page to generate a connectivity score for each of said plurality of pages;

removing from the graph of nodes pages with an undue influence on the scoring of other pages in the plurality of pages, wherein a page has the undue influence on the scoring of other pages in the plurality of pages when said page has a score greater than each score of all other pages in the plurality of pages and said score is at least three times greater than a next highest score of another page in said plurality of pages;

re-scoring remaining pages represented in the graph of nodes; and selecting a subset of the remaining pages represented in the graph of nodes that have connectivity scores greater than a first predetermined threshold as the pages related to the initial page.

16. The method of claim 15 wherein the initial page is selected by specifying an address of the page.

17. The method of claim 15 wherein the initial page is selected by a user interface.

18. The method of claim 15 wherein the connectivity of the plurality of pages are scored on content by measuring the similarity of the plurality of pages to a topic.

19. The method of claim 18 wherein the topic is extracted from the initial page.

20. The method of claim 18 wherein the topic is extracted from the plurality of pages represented in the graph.

21. The method of claim 15 wherein any of the plurality of pages that are linked in any direction to the initial page are represented in the graph.

22. The method of claim 21 wherein the plurality of pages represented in the graph are linked to the initial page by a predetermined number of links.

23. The method of claim 21 wherein each page represented in the graph depends on a pat from each page to the initial page, the path including the length of the path and the direction of edges on the path.

24. The method of claim 21 wherein the plurality of pages represented in the graph as nodes are linked to the node representing the initial page by a number of edges that is determined dynamically.

25. The method of claim 15 performed in a client computer.

26. The method of claim 15 performed in a server computer.

27. The method of claim 15, wherein the step of identifying a plurality of pages linked to the initial page comprises identifying a plurality of pages linked to the initial page by not more than a defined number of links, wherein when said defined number of links is set to two, a page is linked to said initial page only if said page is reachable from said initial page by going one link backwards, said page is reachable from said initial page by going one link forwards, said page is reachable from said initial page by going one link backwards followed by one link forwards, or said page is reachable from said initial page by going one link forward followed by one link backwards.

28. A computer program product readable by a computing system and encoding a computer program of instructions for executing a computer process for identifying pages related to an initial page, said computer process comprising:

identifying a plurality of pages linked to the initial page;

representing the plurality of pages as a graph of nodes;

scoring the plurality of pages on connectivity of said plurality of pages to the initial page to generate a connectivity score for each of said plurality of pages;

removing from the graph of nodes pages with an undue influence on the scoring of other pages in the plurality of pages, wherein a page has the undue influence on the scoring of other pages in the plurality of pages, when said page has a score greater than a predetermined fraction of a total connectivity score, said total connectivity score computed by sung connectivity scores of the plurality of pages;

re-scoring remaining pages represented in the graph of nodes; and selecting a subset of the remaining pages represented in the graph of nodes that have connectivity scores greater than a first predetermined threshold as the pages related to the initial page.

29. The computer program product of claim 28 wherein the computer process selects the initial page by specifying an address of the page.

30. The computer program product of claim 28 wherein the computer process selects the initial page by receiving input from a user interface.

31. The computer program product of claim 28 wherein the computer process scores connectivity of the plurality of pages on content by measuring the similarity of the plurality of pages to a topic.

32. The computer program product of claim 31 wherein the computer process extracts the topic from the initial page.

33. The computer program product of claim 31 wherein the computer process extracts the topic from the plurality of pages represented in the graph.

34. The computer program product of claim 28 wherein the computer process represents the plurality of pages that are linked in any direction to the initial page in the graph.

35. The computer program product of claim 34 wherein the computer process links the plurality of pages represented in the graph to the initial page by a predetermined number of links.

36. The computer program product of claim 34 wherein each page represented in the graph depends on a path from each page to the initial page, the path including the length of the path and the direction of edges on the path.

37. The computer program product of claim 34 wherein the computer process links the plurality of pages represented in the graph as nodes to the node representing the initial page by a number of edges that is determined dynamically.

38. The computer program product of claim 28 wherein the computer process is performed in a client computer.

39. The computer program product of claim 28 wherein the computer process is performed in a server computer.

40. The computer program product of claim 28, wherein the first predetermined threshold is equal to ninety-five percent of the total connectivity score.

41. The computer program product of claim 28, wherein the computer process step of identifying a plurality of pages linked to the initial page comprises identifying a plurality of pages linked to the initial page by not more than a defined number of links, wherein when said defined number of links is set to two, a page is linked to said initial page only if said page is reachable from said initial page by going one link backwards, said page is reachable from said initial page by going one link forwards, said page is reachable from said initial page by going one link backwards followed by one link forwards, or said page is reachable from said initial page by going one link forward followed by one link backwards.

42. A computer program product readable by a computing system and encoding a computer program of instructions for executing a computer process for identifying pages related to an initial page, said computer process comprising:

identifying a plurality of pages linked to the initial page;

representing the plurality of pages as a graph of nodes;

scoring the plurality of pages on connectivity of said plurality of pages to the initial page to generate a connectivity score for each of said plurality of pages;

removing from the graph of nodes pages with an undue influence on the scoring of other pages in the plurality of pages, wherein a page has the undue influence on the scoring of other pages in the plurality of pages when said page has a score greater than each score of all other pages in the plurality of pages and said score is at least three times greater than a next highest score of another page in said plurality of pages;

re-scoring remaining pages represented in the graph of nodes; and selecting a subset of the remaining pages represented in the graph of nodes that have connectivity scores greater than a first predetermined threshold as the pages related to the initial page.

43. The computer program product of claim 42 wherein the computer process selects the initial page by specifying an address of the page.

44. The computer program product of claim 42 wherein the computer process selects the initial page by receiving input from a user interface.

45. The computer program product of claim 42 wherein the computer process scores connectivity of the plurality of pages on content by measuring the similarity of the plurality of pages to a topic.

46. The computer program product of claim 45 wherein the computer process extracts the topic from the initial page.

47. The computer program product of claim 45 wherein the computer process extracts the topic from the plurality of pages represented in the graph.

48. The computer program product of claim 42 wherein the computer process represents the plurality of pages that are linked in any direction to the initial page in the graph.

49. The computer program product of claim 48 wherein the computer process links the plurality of pages represented in the graph to the initial page by a predetermined number of links.

50. The computer program product of claim 48 wherein each page represented in the graph depends on a path from each page to the initial page, the path including the length of the path and the direction of edges on the path.

51. The computer program product of claim 48 wherein the computer process links the plurality of pages represented in the graph as nodes to the node representing the initial page by a number of edges that is determined dynamically.

52. The computer program product of claim 42 wherein the computer process is performed in a client computer.

53. The computer program product of claim 42 wherein the computer process is performed in a server computer.

54. The computer program product of claim 42, wherein the computer process step of identifying a plurality of pages linked to the initial page comprises identifying a plurality of pages linked to the initial page by not more than a defined number of links, wherein when said defined number of links is set to two, a page is linked to said initial page only if said page is reachable from said initial page by going one link backwards, said page is reachable from said initial page by going one link forwards, said page is reachable from said initial page by going one link backwards followed by one link forwards, or said page is reachable from said initial page by going one link forward followed by one link backwards.

* * * * *